May 5, 1970     M. STEINER     3,510,360

STORAGE BATTERY CASING

Filed March 17, 1967     2 Sheets-Sheet 1

Inventor:
Max Steiner
By: Spencer & Kaye
Attorneys

United States Patent Office 3,510,360
Patented May 5, 1970

3,510,360
STORAGE BATTERY CASING
Max Steiner, Lugano, Switzerland, assignor to Isabella Forti, Zurich, Switzerland
Filed Mar. 17, 1967, Ser. No. 624,091
Claims priority, application Switzerland, Mar. 17, 1966, 3,880/66, Patent 442,445
Int. Cl. H01m 45/00, 1/00
U.S. Cl. 136—162          5 Claims

ABSTRACT OF THE DISCLOSURE

A storage battery casing including a container in which the battery cells are disposed, the container being defined by at least two opposing side walls, there being furthermore two outer walls adjoining the side walls and spaced from the side walls by ribs so that air can circulate between the side walls and the outer walls. A completely encased liquid reservoir provides additional liquid for the cell and maintenance-free service over the life of a battery.

BACKGROUND OF THE INVENTION

The invention refers to a storage battery casing to accommodate one or several cells and the cover of which is made of synthetic material.

Conventional storage battery casings generally consist of a container in which the cells are disposed and a cover closing the top of the container. The cover is usually sealed to the container and is provided with a row of openings each having a screwed top through which, during charging of the cells, gas can escape and through which liquid is added when the plates are no longer fully submerged in the liquid. These conventional storage batteries, therefore, must be checked at regular intervals to ascertain whether there is still sufficient liquid in every cell and, if not, to add new liquid. Besides, the terminals of the battery and the terminals of the devices which it powers are subject to constant corrosion which also has to be checked and remedied at certain intervals.

Practical experience, however, has taught that such checks of the level of the liquid and the corrosion at the terminals are never made or made only very irregularly. The result is a reduced output of the whole battery due to the presence of one "dry" cell or to corrosion at the terminals or, as is often the case, due to both. The life of the batteries, therefore, is shortened by inexpert care. This is seen most often with batteries for combustion engines. Despite the good initial quality of the storage battery, it must often be replaced after two years.

SUMMARY OF THE INVENTION

The present invention therefore meets a general need and has as its object to eliminate the need for maintenance and care of the batteries.

Another object of the present invention is to insulate the interior of the battery against extreme temperature variations.

Another object of the present invention is to eliminate the need for periodically adding liquid to such batteries.

Yet another object of the present invention is to provide such batteries with a reservoir from which liquid is periodically delivered to the battery so as to maintain the liquid in the battery cells at a predetermined level.

These and other objects according to the present invention are achieved by the provision of outer walls spaced from side walls of a storage battery casing. A liquid reservoir provided on the top of the cover of the casing is completely encased to provide a maintenance-free life for a battery cell in the casing.

DESCRIPTION OF THE PREFERRED EMBODIMENTS

Figure 1:
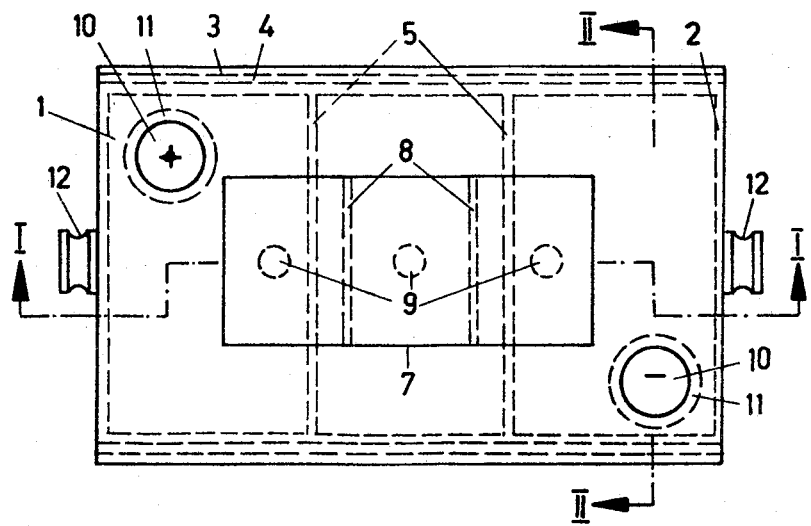
FIG. 1 is a plan view of a preferred embodiment of the present invention.

In FIG. 1, for sake of greater clarity, the cover's outer edge only is drawn. The container consists, in the conventional way, of four side walls 2 (marked by a broken line) and is subdivided in three cells by the partition walls 5. Along the two opposite side walls 2 on the broader side of the container, provision is made at a certain distance for two outer walls 3. There is a space 4 between the inner wall 2 and the outer wall 3. This will be further explained in connection with FIG. 3 of the drawings.

The cover 1 lies on the upper edges of the walls 2 and 5, to which it is rigidly joined after the cells in the container have been fitted with the plates and partitions in the conventional manner. The cover and the container can be permanently and rigidly joined together by glueing since the walls of the container and the cover are made of the same plastic material. Firmly affixed to the cover 1 is a reservoir 7 for liquid which is also made of the same synthetic material as the cover and the container.

The reservoir for liquid is subdivided by the partition walls 8 into three compartments of the same size so that there is one reservoir compartment for liquid provided for each cell. The reservoir for liquid is completely encased except for the bore holes 9 in the cover 1 to each of which—as will be explained later—is joined a tube-like connecting piece. Through these bore holes, communication is established between the various compartments of the reservoir 7 and the respective cells.

The cover 1 is provided in the conventional manner, with further bore holes 10 which serve to accommodate the positive and negative terminals to which, for operation of the storage battery, the terminals of the energy consuming unit are connected. In the cover, around each bore hole 10, is an annular pocket 11 into which is inserted a material which has previously been soaked with anti-corrosion pole grease. In this way, the terminals emerging out of the cover 1 are at all times covered with a thin film as protection against corrosion.

On the two narrow sides of the cover 1, the knobs 12 are firmly affixed. These knobs serve to fasten the whole storage battery casing to the ground plate on which the storage battery rests. For this purpose, a strap of circular cross section and made of elastic material is placed in the groove of the knobs 12. The circular cross section of this strap has the same radius as the groove of the knob 12. The two free ends of the elastic strap are hooked to the ground plate.

Figure 2:
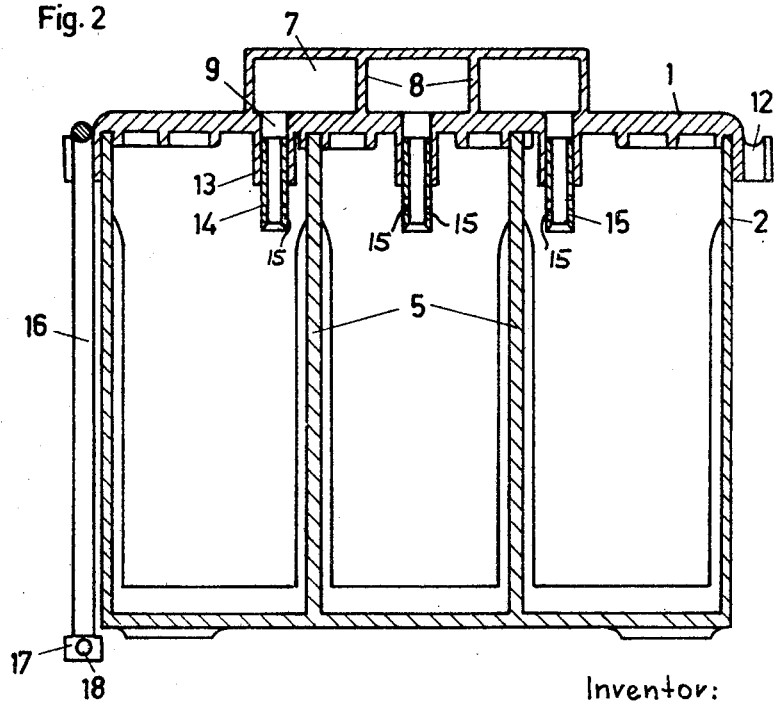
FIG. 2 is an elevational cross-sectional view taken along the line I—I of FIG. 1.

FIG. 2 shows the cover 1, the container side walls 2 and partition walls 5 separating the cells, as well as the liquid reservoir 7 in a sectional view along the section line I—I of FIG. 1. This view shows that the reservoir 7 with its partition walls 8 is completely encased and communicates with the cells only through the bore holes 9.

These bore holes 9 are fitted with tubelike sockets 13. These sockets are made of the same synthetic material as the cover. Into these sockets 13 are fitted tubes 14 which are closed at their lower ends, which extend down into the cell. Above these closed ends, openings 15 are provided in the cylindrical walls of the tubes. Every tube 14 is movable inside its socket 13 and, at assembly, after the cells have been filled with the liquid, can be adjusted in such a way that the openings 15 in the tubes 14 are placed about two millimeters below the level of the liquid in the cell. It must be added here that prior to the above adjustment, the compartments of the reservoir 7 were filled through the sockets 13 with an anti-freezing liquid.

When, after final assembly of the cover 1 with the container, the openings 15 are immersed in the liquid contained in the cells, no distilled water from the reservoir 7 can flow into the cells. This is true because the absence of any air inlet to the reservoir compartments creates a pressure differential which prevents any flow of liquid from those compartments. Only when, in the course of years of operation, the level of the liquid in the cells has dropped so that the openings 15 are no longer covered by the liquid, can air rise through the tubes 14 from the cells to the reservoir 7 with the effect that distilled water will flow into the cells until the openings 15 are again below the level of the liquid.

FIG. 2 shows how the cover 1, which is made of synthetic material, is joined to the walls 2 and 5 of the container and at the same time increases the stability of the container, which is also made of synthetic material. The joints between the cover 1 and the walls 2 and 5 of the container are made rigid and permanent by the use of conventional glues for synthetic materials. The inner surface of the cover 1 is ribbed in a conventional way and this increases the rigidity of the joint. FIG. 2 shows the means of fastening the whole storage battery box by the knobs 12 to the ground plate (not shown). The elastic rubber strap 16 of circular cross section is placed around the knob. The two loose ends, of which only one is shown, are fastened to a rectangular metal rod 17 along its longitudinal axis, this metal rod has a bore hole 18 into which is inserted one part of a clip the other part of which is inserted into a respective groove in the ground plate. Both knobs are fastened in the same way.

Figure 3:
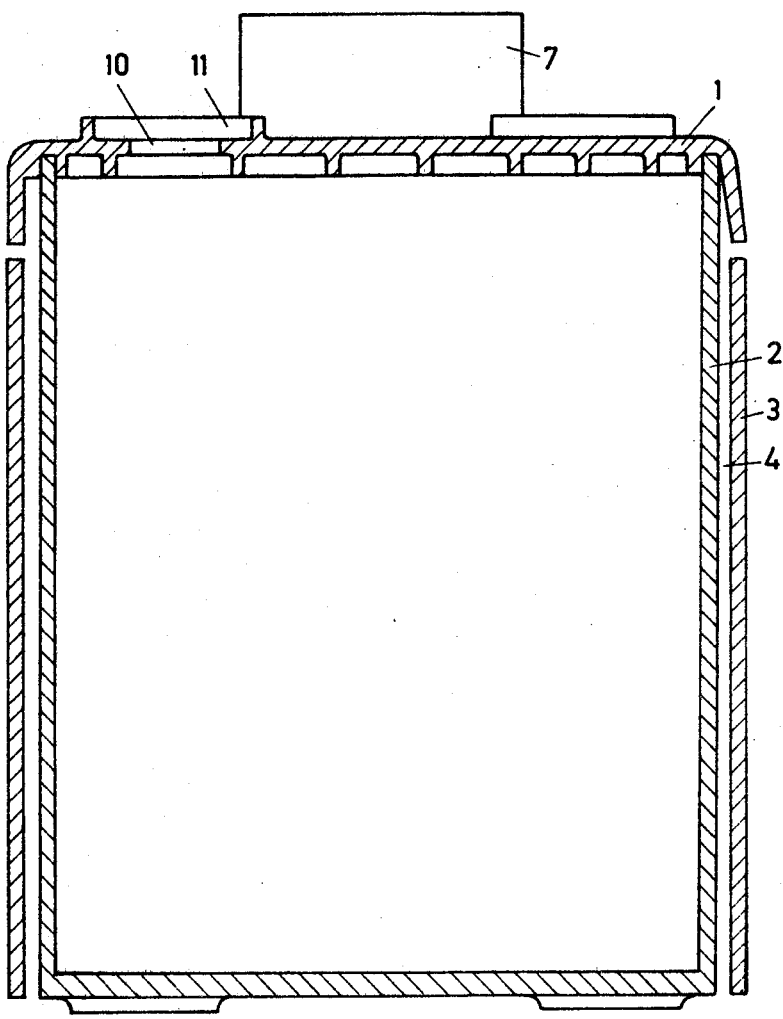
FIG. 3 is an elevational cross-sectional view taken along the line II—II of FIG. 1.

FIG. 3 shows the cover 1 and the container in a sectional view along the line II—II of FIG. 1. In this drawing the relative positions of the walls 2 and 3 are illustrated. Walls 3 not connected to cover 1. As mentioned above, there is a space 4 between the two walls. Through this spacing which is open at both ends, air can circulate freely. This is useful, particularly where the storage battery is placed near sources of great heat. In this way, there is a guarantee that the temperature of the liquid in the cells does not rise excessively. This insulation is useful also where, instead of heat, cold must be reckoned with. The liquid in the cells, therefore, is no longer subject to great fluctuations of temperature.

The sides of the cover 1 are drawn somewhat down over the inner wall 2. The outer walls 3, as shown in FIG. 3, are not of the same height as the inner walls 2. Therefore, between the upper edge of the wall 3 and the side of the cover 1 there remains a slit approximately 4 mm. in height. The interspacing 4 is also about 2–4 mm. thick. Over the total length of the container, ribs are provided at certain intervals which serve to connect each outer wall 3 with its respective inner wall 2. As regards manufacture of the container according to a conventional synthetic material process, it has proved useful to produce the outer walls 3 and the ribs (not shown for the sake of greater clarity) in one piece. This serves to increase the stability of the whole storage battery casing.

Provided in the cover 1 are the bore holes 10. Around each bore hole, an annular pocket, or container, is provided. Into this container—as mentioned above—is introduced some material, a felt ring for instance, the inside diameter of which is exactly the same as the diameter of the terminal. This felt ring is covered with a plate of synthetic material.

It is also possible for the reservoir 7 and the cover 1 to be produced separately. Prior to final assembly of the whole storage battery casing, the reservoir 7 is filled through the sockets 13 with the anti-freezing liquid. After the tubes 14 have been inserted, the reservoir 7 is placed on the longitudinal ribs which are provided on the walls 2 and 5 of the individual cells. Once the reservoir for liquid has been placed on each cell, the cover 1, which in this case is provided with an opening corresponding to the outer measurements of every reservoir compartment is placed on the container. The joints between the container and the cover as well as between the reservoirs for liquid and the cover are glued in the conventional manner.

By the above mentioned constructional measures, a storage battery has been produced which requires neither maintenance nor care. Charging of such a battery is done in the conventional manner. The gases produced during the charging process escape through the cover as usual. This has not been particularly shown in the drawings. Here, however, it must be stressed that no openings with a screwed top are provided, as with the conventional storage battery cases. In the cover, as per the present invention, rather there are provided narrow, labyrinthlike slits which may take the shape, for instance, of the manufacturer's name engraved in the cover.

I claim:

1. In a storage battery comprising a casing including a container and at least one battery cell in the container, the container being made of plastic and being defined by at least two opposing side walls, the improvement comprising at least two outer walls each disposed adjacent a respective one of said container side walls and connected to its associated side wall so as to be separated therefrom by an interspace for the free circulation of air, the upper edge of each container side wall extending above the upper edge of its associated outer wall.

2. An arrangement as defined in claim 1 wherein each said outer wall is connected to its associated side wall by spaced ribs, and each said outer wall, its associated container side wall and ribs are made of one piece.

3. An arrangement as defined in claim 1, further comprising a plastic cover rigidly connected to and covering the top of said container, a completely encased liquid reservoir non-detachably connected to said cover, a battery cell in said container, liquid filling said cell to a predetermined level, liquid in said reservoir, and means for allowing liquid to flow from said reservoir to said cell as needed to maintain said level.

4. In a storage battery casing including a container defined by at least two opposing side walls for receiving at least one battery cell, and a cover rigidly connected to and covering the top of the container, both the cover and the container being made of plastic, the improvement comprising:
 (a) a liquid reservoir nondetachably connected to said cover; and
 (b) at least two outer walls each disposed adjacent a respective one of said container side walls and connected to its associated side wall so as to be separated therefrom by an interspace for the free circulation of air, the upper edge of each container side wall extending above the upper edge of its associated outer wall.

5. An arrangement as defined in claim 4 wherein each said outer wall is connected to its associated side wall by spaced ribs, and each said outer wall, its associated container side wall and ribs are made of one piece.

(References on following page)

References Cited

UNITED STATES PATENTS

| | | | |
|---|---|---|---|
| 971,876 | 10/1910 | Apple | 136—166 XR |
| 1,243,202 | 10/1917 | Muzzy | 136—162 |
| 1,671,016 | 5/1928 | Dewey | 136—163 |
| 1,673,198 | 6/1928 | Martus et al. | 136—162 XR |
| 1,680,038 | 8/1928 | Dunzweiler | 136—163 |
| 2,092,214 | 9/1937 | Janko. | |
| 2,832,814 | 4/1958 | Shannon | 136—162 |
| 3,082,286 | 3/1963 | Schuster | 136—162 |
| 3,150,012 | 9/1964 | Tanaka | 136—162 |
| 1,705,928 | 3/1929 | Lambert | 220—9 |
| 2,661,889 | 12/1953 | Phinney | 220—11 |

WINSTON A. DOUGLAS, Primary Examiner

D. L. WALTON, Assistant Examiner

U.S. Cl. X.R.

136—166, 170